US010045374B2

(12) United States Patent
Attar et al.

(10) Patent No.: US 10,045,374 B2
(45) Date of Patent: Aug. 7, 2018

(54) LOW LATENCY WLAN MEDIUM ACCESS

(71) Applicant: QUALCOMM Incorporated, San Diego, CA (US)

(72) Inventors: Rashid Ahmed Akbar Attar, San Diego, CA (US); Linhai He, San Diego, CA (US); Bibhu Prasad Mohanty, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/719,084

(22) Filed: May 21, 2015

(65) Prior Publication Data
US 2016/0037553 A1 Feb. 4, 2016

Related U.S. Application Data

(60) Provisional application No. 62/030,510, filed on Jul. 29, 2014, provisional application No. 62/049,289, filed on Sep. 11, 2014.

(51) Int. Cl.
*H04W 72/14* (2009.01)
*H04W 72/00* (2009.01)
*H04W 74/04* (2009.01)
*H04W 74/06* (2009.01)

(52) U.S. Cl.
CPC ............ *H04W 74/04* (2013.01); *H04W 74/06* (2013.01)

(58) Field of Classification Search
CPC .... H04W 72/14; H04W 72/005; H04W 84/12
See application file for complete search history.

(56) References Cited

U.S. PATENT DOCUMENTS

| 7,990,872 | B2 | 8/2011 | Ahn |
| 8,194,604 | B2 | 6/2012 | Gault et al. |
| 8,457,124 | B2 | 6/2013 | Mosko |
| 2005/0165946 | A1* | 7/2005 | Stephens ............... H04W 28/26 709/233 |
| 2005/0270975 | A1* | 12/2005 | Meylan .................. H04L 47/14 370/229 |
| 2009/0138603 | A1* | 5/2009 | Surineni ............. H04W 76/023 709/227 |
| 2010/0142496 | A1* | 6/2010 | Lee ..................... H04W 72/048 370/337 |
| 2012/0020336 | A1 | 1/2012 | Bahr et al. |
| 2013/0083781 | A1* | 4/2013 | Zhang ................. H04W 72/042 370/336 |
| 2013/0260686 | A1 | 10/2013 | Mukherjee |

* cited by examiner

*Primary Examiner* — Yemane Mesfin
*Assistant Examiner* — Henry Baron
(74) *Attorney, Agent, or Firm* — Paradice and Li, LLP

(57) ABSTRACT

A method and apparatus for managing access to a wireless medium by one or more stations (STAs) in a wireless network. A device determines a first transmit opportunity for a first STA of the one or more STAs in the wireless network. The device enables the first STA to access the wireless medium for a duration of the first transmit opportunity by broadcasting a first grant message to the one or more STAs in the wireless network. The first grant message indicates allocation of the first transmit opportunity to the first STA. The device may selectively adjust the duration of the first transmit opportunity based at least in part on one or more properties of the wireless network.

16 Claims, 11 Drawing Sheets

LOW LATENCY WLAN MEDIUM ACCESS

CROSS-REFERENCE TO RELATED APPLICATIONS

This application claims priority to U.S. Provisional Patent Application No. 62/030,510 entitled "LOW LATENCY WLAN MEDIUM ACCESS" filed Jul. 29, 2014, and to U.S. Provisional Patent Application No. 62/049,289 entitled "LOW LATENCY WLAN MEDIUM ACCESS" filed Sep. 11, 2014, the entireties of both of which are incorporated by reference herein.

TECHNICAL FIELD

The example embodiments relate generally to wireless networks, and specifically to reducing collisions in a wireless network.

BACKGROUND OF RELATED ART

A Wi-Fi network may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the Wi-Fi network. The beacon frames, which may include a traffic indication map (TIM) indicating whether the AP has queued downlink data for the STAs, are typically broadcast according to a target beacon transmission time (TBTT) schedule. The broadcasted beacon frame may also include the AP's timing synchronization function (TSF) value. The STAs may synchronize their own local TSF values with the broadcasted TSF value, for example, so that all the STAs are synchronized with each other and the AP.

In a typical WLAN, only one device may use the wireless medium at any given time. To arbitrate access to the shared wireless medium, the IEEE 802.11 standards define a distributed coordination function (DCF) that instructs individual STAs (and APs) to "listen" to the medium to determine when the medium is idle (e.g., using a "carrier sense" technique). For example, only when a STA detects that the medium has been continuously idle for a DCF Interframe Space (DIFS) duration may the STA attempt to transmit data on the medium. To prevent multiple devices from accessing the medium at the same time, each device may select a random "back-off" number or period. At the end of the DIFS duration, a contention period begins during which each device waits for a period of time determined by its back-off number (e.g., its back-off period) before it attempts to transmit data on the medium. The device that selects the lowest back-off number will have the shortest back-off period, and therefore "wins" the medium access contention operation. The winning device may be granted access to the shared wireless medium for a period of time commonly referred to as a transmit opportunity (TXOP), during which the winning device may transmit data over the shared wireless medium.

If multiple devices select the same back-off value and then attempt to transmit data at the same time, a collision would occur and thus the devices contend for medium access again using an exponential back-off procedure. More specifically, after a collision is detected, each device selects another random number, and then doubles the selected random number to generate the device's next back-off value. Although doubling the size of the back-off values for successive contention periods may reduce the chance of collisions (e.g., as compared with earlier contention periods that resulted in collisions), transmission latencies are undesirably increased. These transmission latencies are exacerbated as the number of devices in the WLAN system increases. For example, for a typical WLAN system, the average transmission latency may be 4 ms or greater.

The transmission latencies for WLAN systems may result in such WLAN systems being unsuitable for applications requiring smaller transmission latencies. For example, many robotics, industrial controls systems, and real-time computing applications require transmission latencies on the order of 1 ms, which is much less than the transmission latency of a typical WLAN system.

Thus, there is a need to reduce transmission latencies for WLAN systems without adversely affecting performance.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method and apparatus for managing access to a wireless medium by one or more stations (STAs) in a wireless network. For example, the wireless network may be an IEEE 802.11 wireless network. A computing device determines a first transmit opportunity for a first STA of the one or more STAs in the wireless network. The computing device enables the first STA to access the wireless medium for a duration of the first transmit opportunity by broadcasting a first grant message to the one or more STAs in the wireless network. The first grant message indicates the first transmit opportunity. The computing device may selectively adjust the first transmit opportunity based at least in part on one or more properties of the wireless network. Further, the first transmit opportunity may be repeated one or more times within a beacon interval.

The computing device may further determine a second transmit opportunity for a second STA of the one or more STAs. For example, the second transmit opportunity may be subsequent to the first transmit opportunity. The computing device may enable the second STA to access the wireless medium for a duration of the second transmit opportunity based at least in part on the first grant message. For example, the first grant message may indicate both the first and second transmit opportunities.

Alternatively, the computing device may enable the second STA to access the wireless medium for a duration of the second transmit opportunity by broadcasting a second grant message to the one or more STAs in the wireless network. The second grant message may indicate the second transmit opportunity. Specifically, the computing device may enable the second STA to access the wireless medium upon completion of the first transmit opportunity. Additionally, the computing device may enable the second STA to access the wireless medium after a threshold duration if no data is received from the first STA within the threshold duration. For example, the threshold duration may be a short interframe space (SIFS) duration.

The computing device may adjust the first transmit opportunity based at least in part on a latency of the wireless network. For example, the computing device may increase or decrease the duration and/or frequency of the first transmit opportunity in response to changes in latency requirements of the one or more STAs. Alternatively, and/or in addition, the computing device may adjust the first transmit opportunity based at least in part on a number of STAs in the wireless network. For example, the computing device may increase or decrease the duration and/or frequency of the first transmit opportunity in response to STAs being added to and/or removed from the wireless network.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

The example embodiments are described below in the context of Wi-Fi enabled devices for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "wireless local area network (WLAN)" and "Wi-Fi" can include communications governed by the IEEE 802.11 standards, Bluetooth®, HiperLAN (a set of wireless standards, comparable to the IEEE 802.11 standards, used primarily in Europe), and other technologies used in wireless communications. In addition, although described herein in terms of exchanging data frames between wireless devices, the example embodiments may be applied to the exchange of any data unit, packet, and/or frame between wireless networks.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

Figure 1:
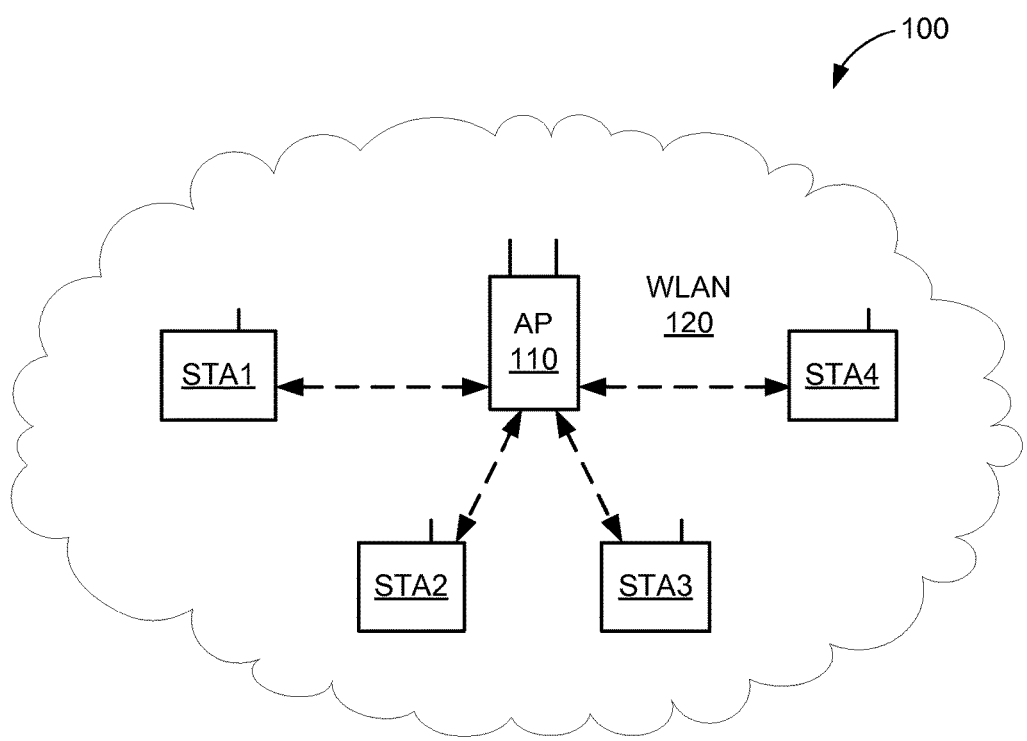
FIG. 1 shows an example wireless network system within which the example embodiments may be implemented.

FIG. 1 shows an example wireless network system 100 within which the example embodiments may be implemented. The system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address.

Each of the stations STA1-STA4 may be any suitable Wi-Fi enabled wireless device including, for example, a cell phone, personal digital assistant (PDA), tablet device, laptop computer, or the link. Each station (STA) may also be referred to as user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 9-11.

The one or more transceivers may include Wi-Fi transceivers, Bluetooth transceivers, cellular transceivers, and/or other suitable radio frequency (RF) transceivers (not shown for simplicity) to transmit and receive wireless communications signals. Each transceiver may communicate with other wireless devices in distinct operating frequency bands and/or using distinct communications protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the $3^{rd}$ Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within stations STA1-STA4 may be any technically feasible transceiver such as a ZigBee transceiver described by a specification from the ZigBee specification, a Wi-Gig transceiver, and/or a HomePlug transceiver described by a specification from the HomePlug Alliance.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, a network interface, one or more processing resources, and one or more memory sources. The one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 9-11.

In accordance with the IEEE 802.11 standards, the AP 110 may transmit beacon frames at regularly scheduled time periods to announce the existence of WLAN 120, to synchronize timer values of the stations STA1-STA4, and/or to indicate the presence of buffered downlink data in the AP 110. In example embodiments, the AP 110 may advertise "trimmed" beacon frames which may be broadcast much more frequently than standard beacons. For example, a trimmed beacon frame may include only the MAC header, timestamp, beacon interval, capability, SSID, supported rates, and frame check sequence (FCS) fields. Alternatively, the trimmed beacon frame may include only a subset (e.g., any combination) of the aforementioned items. The number of time units between target beacon transmission times (TBTTs) is referred to herein as the "beacon interval," the value of which may be included within the beacon frames.

The AP 110 may include a TSF timer (not shown for simplicity) that maintains a TSF value for the WLAN 120. For example, the TSF timer may be a modulus $2^{64}$ counter that increments in micro-seconds, and thus has a maximum count value of $2^{64}=102,400$ micro-seconds (although other suitable timers, clocks, and/or counters may be used). Accordingly, the TSF timer of AP 110 may provide a beacon interval of approximately 100 milliseconds. Each of stations STA1-STA4 may include its own TSF timer (not shown for simplicity) that maintains a local TSF value for the STA. For some embodiments, the TSF timer may also be a modulus $2^{64}$ counter that increments in micro-seconds, and thus has a maximum count value of $2^{64}=102,400$ micro-seconds (although other suitable timers, clocks, and/or counters may be used).

Both the AP 110 and the stations STA1-STA4 may use a pre-stored rate lookup table to choose a coding rate (e.g., modulation and coding scheme) to be used for subsequent data transmissions. For example, the index used in the lookup table may be an average received signal strength indication (RSSI) value measured from recent transmissions. A modulation and coding scheme (MCS) may be chosen with a large margin in transmission rates to ensure high reliability even in the presence of interference from other networks.

The AP 110 may assign each of the stations STA1-STA4 a unique association identifier (AID) (e.g., during association procedures), and maintain a mapping of the AID and MAC addresses for the stations STA1-STA4. The AIDs assigned to the stations STA1-STA4 may be used to indicate which STAs have downlink data buffered in the AP 110. In example embodiments, the AIDs may also be used to determine transmission time slots for each of the stations STA1-STA4, as described in more detail below.

The stations STA1-STA4 may determine whether the AP 110 has buffered downlink data by analyzing bitmap information in a traffic indication map (TIM) element contained in the beacon frames. The TIM element includes a partial virtual bitmap that provides a one to one mapping between bits in the bitmap and the AIDs assigned to the stations STA1-STA4. Thus, when the AP 110 assigns AIDs to the stations STA1-STA4 during an association procedure, each STA associated with the AP 110 is assigned one bit in the bitmap of the TIM element. If the TIM element in a beacon frame indicates the presence of buffered downlink data for the STA, then the STA remains in an awake state until the data is delivered. Otherwise, the STA may return to the sleep state after receiving the beacon frame.

In accordance with example embodiments, the stations STA1-STA4 may transmit uplink data via the WLAN 120 using a time-division multiple access (TDMA) based medium access technique (e.g., in lieu of conventional CSMA/CA techniques). For example, when operating in a "TMDA Mode," each of the stations STA1-STA4 may be assigned a time slot for medium access. The time slots, which may be assigned by the AP 110, may instruct each STA as to when that STA may access the shared medium (e.g., to transmit data). For example, the AP 110 may provide a transmit opportunity (TXOP) to each of the associated STAs. Each TXOP may be associated with a time slot duration (e.g., also referred to herein as a TXOP duration) and may be included in "grant" messages broadcast from the AP. In example embodiments, a grant message may be broadcast as a unique control frame specifying one or more TXOPs for respective stations STA1-STA4. Alternatively, the grant message may be provided with any other suitable frame transmitted from the AP 110 (e.g., beacon frames and action frames).

Upon receiving a grant message, each STA may use its AID value to generate start times for its TXOPs. The start times may be based on, or related to, the TBTTs. Once all of the associated stations STA1-STA4 have determined their start times, each STA may begin transmitting data at its corresponding start time, and may transmit for as long as its TXOP duration. When a particular TXOP duration ends, the next STA may begin transmitting data at its corresponding start time. The assigned time slots may repeat in the same period, for a number of times, during any given beacon interval (e.g., depending upon the number of associated STAs and the selected duration of each time slot). In example embodiments, the TXOP durations may be adjusted based on latency requirements, based on the number of STAs in the WLAN 120, and/or based on other parameters of the WLAN 120. Because STAs are allowed to transmit data only during their assigned time slots, there should not be any collisions on the shared wireless medium. Furthermore, because STAs are not required to contend for access to the shared wireless medium, TDMA-based medium access techniques may reduce transmission latencies associated with the WLAN 120 (e.g., as compared to CSMA/CA techniques).

In other example embodiments, the AP 110 may selectively allow access to the shared wireless medium in an "on-demand" manner, for example, by broadcasting grant messages in response to request-to-send (RTS) messages received from individual STAs. For example, when a particular STA wishes to transmit data, that STA may send an RTS frame to the AP 110. The AP 110 may respond by broadcasting a grant message to the STAs in the wireless network. The grant message, which may include TXOP information (and other scheduling information), may alert the requesting STA that it has been granted medium access for a corresponding TXOP duration. As described above, the time slot duration is determined by the AP and may vary for different STAs and/or service periods.

For some aspects, the RTS frames may be omitted to reduce latencies associated with the exchange of RTS frames and grant messages. For example, rather than the STA sending an RTS frame to request medium access, the AP 110 may "poll" its associated STAs by broadcasting grant messages for each of the stations STA1-STA4 (e.g., in a round-robin manner or using another suitable schedule or transmission ordering). When a STA receives a grant message indicating a TXOP for that STA, the STA may transmit data via the WLAN 120. If the AP 110 does not detect a data transmission within a threshold duration after broadcasting a grant message (e.g., indicating that the STA does not have any data to send), then the AP 110 may broadcast a grant message for the next STA in the transmission schedule or order. Thus, when operating in "Polling Mode," the AP 110 may control medium access for its associated stations STA1-STA4 by broadcasting a sequence of grant messages (e.g., wherein each grant message specifies a TXOP for one particular STA).

Depending on channel conditions and/or network requirements, it may be preferable to use one mode of allocating medium access over the other(s). For example, TDMA-based medium access has a lower overhead requirement (e.g., since it does not require constant polling by the AP 110) and may be implemented more efficiently in networks with static nodes and/or traffic patterns. However, TDMA-based medium access may be less robust against interference and tends to be less efficient when used with dynamic networks and/or changing traffic patterns. On the other hand, polling-based medium access may handle interference better than TDMA-based medium access and may offer greater flexibility in handling changes in network nodes or their traffic patterns. However, polling-based medium access has a greater overhead requirement (e.g., due to constant polling by the AP 110) and also tends to produce more jitter.

In an example embodiment, the AP 110 and each of the stations STA1-STA4 may be selectively operable in either TDMA Mode or Polling Mode. Specifically, the AP 110 may instruct the stations STA1-STA4 to implement a particular medium access technique, for example, by modifying the receiver address (RA) field of a grant message. For example, when operating in Polling Mode, the RA field of each grant message may specify the particular STA that is to be given access to the channel. In order to operate in TDMA mode, the AP 110 may modify the RA field of a grant message to specify the BSSID of the AP 110. Thus, upon receiving a grant message with an RA field specifying the BSSID of the AP 110, each of the stations STA1-STA4 may determine its own start time based at least in part on the TXOPs indicated in the grant message. The stations STA1-STA4 may then access the channel, independently, based on their respective TXOPs.

Figure 2:
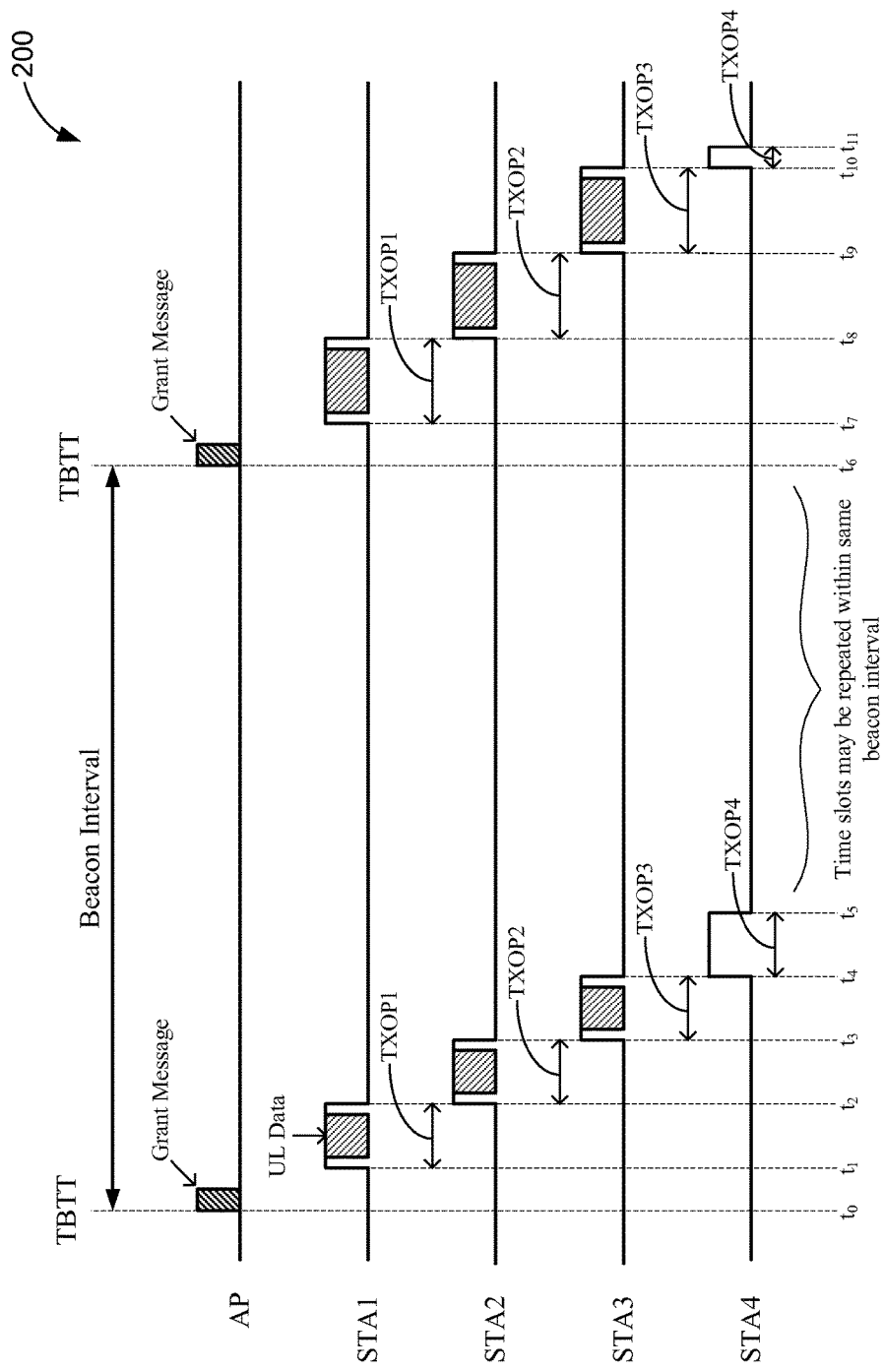
FIG. 2 shows an example timing diagram depicting a scheduling of uplink data transmissions by multiple wireless stations (STAs) according to time slots assigned by an access point (AP).

FIG. 2 shows an example timing diagram 200 depicting a scheduling of uplink data transmissions by multiple STAs according to time slots assigned by an AP. For purposes of discussion herein, the AP and stations STA1-STA4 may be AP 110 and stations STA1-STA4, respectively, of FIG. 1.

At time $t_0$, the AP 110 broadcasts a grant message at the first TBTT. As described above, the grant message may be included in a beacon frame broadcast by the AP 110 or broadcast as a separate control frame. The grant message may specify or otherwise indicate a TXOP for each of the stations STA1-STA4. For example, the grant message may indicate a first transmit opportunity (TXOP1) to be assigned to STA1, a second transmit opportunity (TXOP2) to be assigned to STA2, a third transmit opportunity (TXOP3) to be assigned to STA3, and a fourth transmit opportunity (TXOP4) to be assigned to STA4. More specifically, each TXOP may follow immediately after a previous TXOP in the sequence so that there is little, if any, time that the wireless medium is idle (e.g., when no STA has access to the medium). For some embodiments, the transmit opportunities TXOP1-TXOP4 may be repeated in the same (or varying) order within the same beacon interval (e.g., from time $t_0$ to $t_6$).

In example embodiments, each of the stations STA1-STA4 may use its assigned AID value and respective TXOP information to generate a transmission schedule for its uplink (UL) data. The TXOP information may include a predetermined time slot duration (e.g., a TXOP duration). For some embodiments, each STA may multiple its assigned AID value by the corresponding TXOP duration to generate a respective transmission start time (e.g., as measured from the beginning of the beacon interval, at time $t_0$). Each STA may transmit data only during its own time slot, thereby avoiding collisions without employing CSMA/CA techniques.

For example, assume that STA1 has an AID=0, STA2 has an AID=1, STA3 has an AID=2, STA4 has an AID=3, and that each of the transmit opportunities TXOP1-TXOP4 has a time slot duration of 200 µs. Each STA may use its AID to calculate its corresponding start time, for example, using the following equation:

$$\text{Start Time} = \sum_{i=0}^{AID} TXOP(i)$$

where TXOP0 represents the start time associated with the first time slot in the sequence. For example, TXOP0 may correspond to a short interframe space (SIFS) duration (e.g., approximately 10 µs) from the end of a grant message. Thus, STA1 may calculate its start time as TXOP0=10 µs after the TBTT; STA2 may calculate its start time as TXOP0+TXOP1=210 µs after the TBTT; STA3 may calculate its start time as TXOP0+TXOP1+TXOP2=410 µs after the TBTT; and STA4 may calculate its start time as TXOP0+TXOP1+TXOP2+TXOP3=610 µs after the TBTT. These example slot times are summarized below in Table 1.

TABLE 1

| Station | Start time from TBTT (μs) | Duration (μs) |
|---|---|---|
| STA1 | 10 | 200 |
| STA2 | 210 | 200 |
| STA3 | 410 | 200 |
| STA4 | 610 | 200 |

Once all of the stations STA1-STA4 have determined their respective start times, each STA may begin transmitting data at its corresponding start time, and may transmit for as long as its respective TXOP duration. When a particular TXOP duration ends, the next STA may begin transmitting data at its corresponding start time. For example, at time $t_1$ (e.g., which is approximately 10 μs after time $t_0$), STA1 may transmit data during TXOP1, which lasts from time $t_1$ to $t_2$. At time $t_2$ (e.g., which is approximately 210 μs after time $t_0$), STA2 may transmit data during TXOP2, which lasts from time $t_2$ to $t_3$. At time $t_3$ (e.g., which is approximately 410 μs after time $t_0$), STA3 may transmit data during TXOP3, which lasts from time $t_3$ to $t_4$. At time $t_4$ (e.g., which is approximately 610 μs after time $t_0$), STA4 may transmit data during TXOP4, which lasts from time $t_4$ to $t_5$. By time $t_5$ (e.g., which is approximately 810 μs after time $t_0$), all of the stations STA1-STA4 have been granted a TXOP during the first beacon interval (e.g., from time $t_0$ to $t_6$).

If there is any unused time after all the stations STA1-STA4 have been granted a TXOP during particular beacon interval, as depicted in FIG. 2, the stations STA1-STA4 may repeat their transmissions according to the transmission schedule. The assigned time slots may be repeated a number of times during any given beacon interval (e.g., depending upon the number of associated STAs and the selected duration of each time slot). In example embodiments, the AP 110 may adjust the TXOP duration for one or more of the stations STA1-STA4 to allow stations more or less time to transmit UL data in subsequent TXOPs. For example, the time slot durations may be adjusted based on latency requirements of the stations STA1-STA4, based on the number of STAs in the WLAN 120, and/or based on other parameters of the WLAN 120.

In the example of FIG. 2, STA4 does not have any UL data to transmit during its respective time slot (e.g., TXOP4). For example, STA4 may have lower latency requirements (e.g., and therefore may not need to transmit as often), may be idle, or may have disconnected from the WLAN 120 entirely. Accordingly, the AP 110 may reduce the TXOP duration for STA4 while at the same time increasing the TXOP durations for the remaining stations STA1-STA3. For example, at time $t_6$, the AP 110 broadcasts a new grant message at the second TBTT. The new grant message may indicate adjusted transmit opportunities TXOP1-TXOP4 for the stations STA1-STA4, respectively. In particular, the transmit opportunities TXOP1-TXOP3 may be longer in duration than they were in a previous iteration (e.g., during the first beacon interval, from time $t_0$ to $t_6$), while TXOP4 may be shorter in duration that it was in the previous iteration.

For example, assume that each of the transmit opportunities TXOP1-TXOP3 now has a time slot duration of 300 μs, whereas TXOP4 now has a time slot duration of 100 μs. Assuming the AID values remain unchanged, STA1 may calculate its start time as TXOP0=10 μs after the TBTT; STA2 may calculate its start time as TXOP0+TXOP1=310 μs after the TBTT; STA3 may calculate its start time as TXOP0+TXOP1+TXOP2=610 μs after the TBTT; and STA4 may calculate its start time as TXOP0+TXOP1+TXOP2+TXOP3=910 μs after the TBTT. However, since the duration of the time slot for TXOP4 is only 100 μs, STA1 may calculate its next start time (e.g., assuming the order is repeated) as TXOP0+TXOP1+TXOP2+TXOP3+TXOP4=1010 μs after the TBTT. These example adjusted slot times are summarized in Table 2.

TABLE 2

| Station | Start time from TBTT (μs) | Duration (μs) |
|---|---|---|
| STA1 | 10 | 300 |
| STA2 | 310 | 300 |
| STA3 | 610 | 300 |
| STA4 | 910 | 100 |

Once the stations STA1-STA4 have determined their new start times, each STA may begin transmitting data at its corresponding start time, and may transmit for as long as its new TXOP duration. For example, at time $t_7$ (e.g., which is approximately 10 μs after time $t_6$), STA1 may transmit data during TXOP1, which lasts from $t_7$ to $t_8$. At time $t_8$ (e.g., which is approximately 310 μs after time $t_6$), STA2 may transmit data during TXOP2, which lasts from time $t_8$ to $t_9$. At time $t_9$ (e.g., which is approximately 610 μs after time $t_6$), STA3 may transmit during TXOP3, which lasts from time $t_9$ to $t_{10}$. At time $t_{10}$ (e.g., which is approximately 910 μs after time $t_6$), STA4 may transmit during TXOP4, which lasts from time $t_{10}$ to $t_{11}$. By time $t_{11}$ (e.g., which is approximately 1010 μs after time $t_6$), all of the stations STA1-STA4 have been granted a TXOP during the second beacon interval.

In the example of FIG. 2, the AP 110 provides the transmit opportunities TXOP1-TXOP4 for all of the stations STA1-STA4 in a single grant message (e.g., broadcasted at the start of each beacon interval). This may lead to inefficient allocation of the wireless medium when one or more of the stations STA1-STA4 (e.g., such as STA4) does not have any UL data to transmit during its assigned time slot (e.g., TXOP4). Thus, in some example embodiments, the AP 110 may control access to the wireless medium on an individualized basis, for example, by broadcasting grant messages with a single TXOP for a particular STA.

Figure 3A:
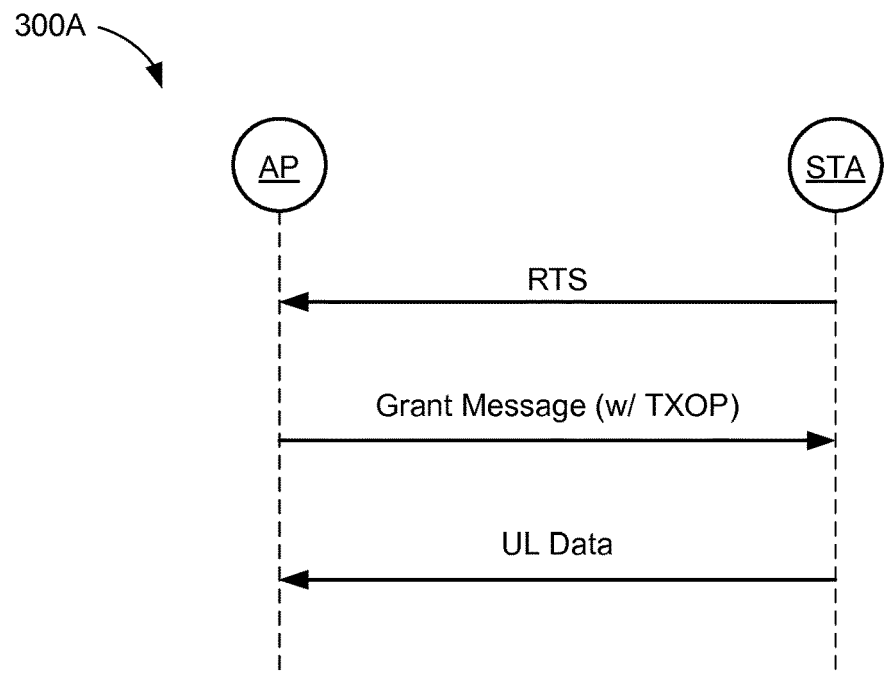
FIGS. 3A and 3B show example sequence diagrams depicting transmit opportunity (TXOP) assignments by an AP to a STA.

In one such embodiment, the AP 110 may selectively allow access to the wireless medium in an on-demand manner. Specifically, the AP 110 may broadcast grant messages in response to RTS messages sent by individual stations STA1-STA4. For example, with reference to the sequence diagram 300A of FIG. 3A, when a STA wants to transmit data, the STA may send an RTS frame to the AP. The AP may respond to the RTS frame by broadcasting a grant message specifying or otherwise indicating a TXOP for that particular STA. The grant message may alert the STA that it has been granted access to the wireless medium for a given TXOP duration, while also alerting other STAs that they may not transmit for at least the TXOP duration indicated in the grant message. The requesting STA may proceed by transmitting UL data during its assigned TXOP.

Figure 4:
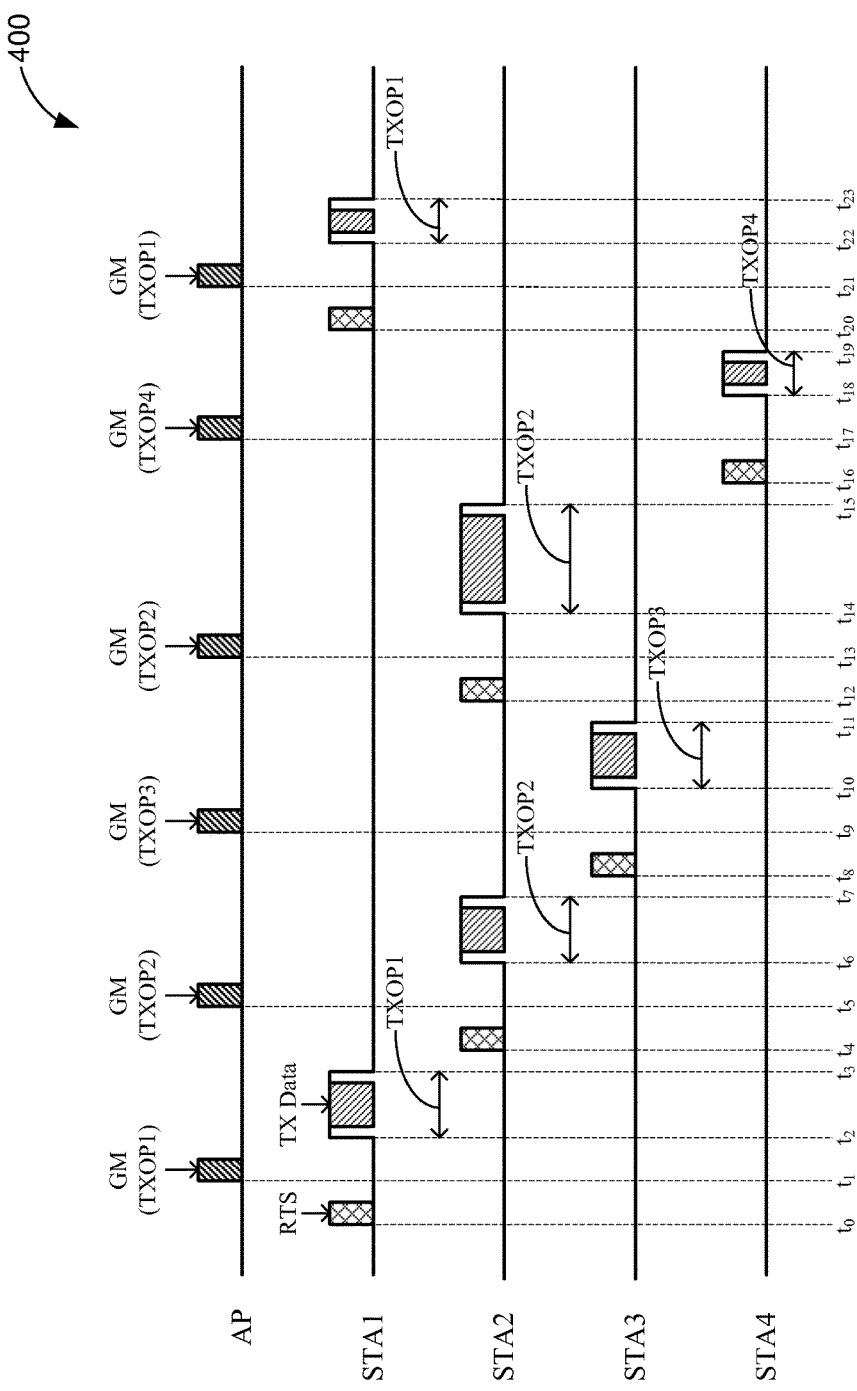
FIG. 4 shows an example timing diagram depicting a scheduling of uplink data transmissions by multiple STAs according to TXOPs granted by an AP in an on-demand fashion.

FIG. 4 shows an example timing diagram 400 depicting a scheduling of uplink data transmissions by multiple STAs according to TXOPs granted by an AP in an on-demand fashion. For purposes of discussion herein, the AP and stations STA1-STA4 may be AP 110 and stations STA1-STA4, respectively, of FIG. 1.

At time $t_0$, the AP 110 receives an RTS frame from STA1 and, at time $t_1$, broadcasts a grant message indicating a transmit opportunity for STA1 (e.g., TXOP1). As described above, the TXOP information included with the grant message may include a predetermined time slot duration (e.g., a TXOP duration). Since TXOPs are granted in an on-demand manner by the AP 110, the requesting STA does not have to calculate a start time to begin transmitting data. For example, STA1 may begin transmitting UL data as soon as it receives the grant message from the AP 110, at time $t_2$, and may have continued access to the wireless medium for the duration of its transmit opportunity TXOP1, which lasts until time $t_3$. The other stations STA2-STA4 may also receive the grant message broadcast by the AP 110 (e.g., at time $t_1$), and in response thereto may refrain from attempting to access the wireless medium for the duration of the transmit opportunity TXOP1.

At time $t_4$, the AP 110 receives an RTS frame from STA2 and, at time $t_5$, broadcasts a grant message indicating a transmit opportunity for STA2 (e.g., TXOP2). STA2 may begin transmitting UL data as soon as it receives the grant message from the AP 110, at time $t_6$, and may have continued access to the wireless medium for the duration of its transmit opportunity TXOP2, which lasts until time $t_7$. At time $t_8$, the AP 110 receives an RTS frame from STA3 and, at time $t_9$, broadcasts a grant message indicating a transmit opportunity for STA3 (e.g., TXOP3). STA3 may begin transmitting UL data as soon as it receives the grant message from the AP 110, at time $t_{10}$, and may have continued access to the wireless medium for the duration of its transmit opportunity TXOP3, which lasts until time $t_{11}$.

At time $t_{12}$, the AP 110 receives another RTS frame from STA2. By this time, the AP 110 may have determined that STA4 has a very low transmit latency, or that STA4 is idle or disconnected from the WLAN 120. Thus, the AP 110 may increase the duration of the transmit opportunities TXOP1-TXOP3 for the other stations STA1-STA3, respectively (e.g., while reducing the duration of the transmit opportunity TXOP4 for STA4). In response to the second RTS frame sent by STA2, the AP 110 broadcasts a grant message, at time $t_{13}$, indicating the adjusted TXOP2 (e.g., with the extended duration). STA2 may once again begin transmitting UL data as soon as it receives the grant message from the AP 110, at time $t_{14}$, and may have continued access to the wireless medium for the extended duration now associated with TXOP2, which lasts until time $t_{15}$.

At time $t_{16}$, the AP 110 receives an RTS frame from STA4. The AP 110 may readjust the transmit opportunities TXOP1-TXOP3 to account for the activity from STA4. For example, the AP 110 may shorten the duration of each of the transmit opportunities TXOP1-TXOP3 to ensure that each of the stations STA1-STA4 is allowed access to the wireless medium within a reasonable amount of time. In response to the RTS frame sent by STA4, the AP 110 broadcasts a grant message, at time $t_{17}$, indicating a transmit opportunity for STA4 (e.g., TXOP4). STA4 may then begin transmitting UL data as soon as it receives the grant message from the AP 110, at time $t_{18}$, and may have continued access to the wireless medium for the duration of its transmit opportunity TXOP4, which lasts until time $t_{19}$.

At time $t_{20}$, the AP 110 receives another RTS frame from STA1. By this time, the AP 110 has already shortened the duration of each of the transmit opportunities TXOP1-TXOP4. In response to the RTS frame sent by STA1, the AP 110 broadcasts a grant message, at time $t_{21}$, indicating the adjusted TXOP1 with the shortened duration. STA1 may once again begin transmitting UL data as soon as it receives the grant message from the AP 110, at time $t_{22}$, and may have continued access to the wireless medium for the shortened duration associated with TXOP1, which lasts until time $t_{23}$.

Figure 3B:
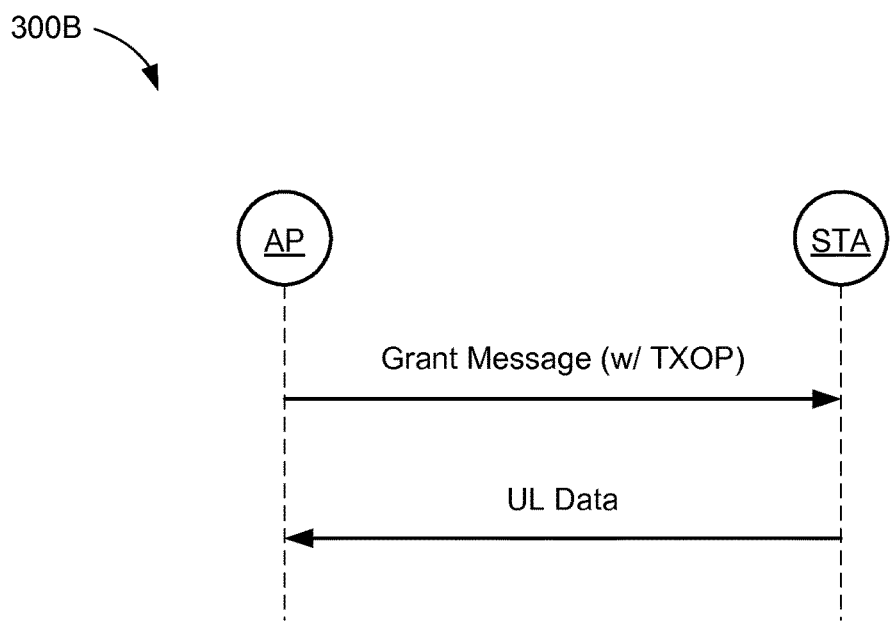

In another embodiment, the AP 110 may poll each of the stations STA1-STA4 to determine which, if any, of the STAs have UL data to transmit. For example, with reference to the sequence diagram 300B of FIG. 3B, the AP 110 may broadcast a respective grant message for each of the stations STA1-STA4 in a round-robin manner (e.g., or using another suitable schedule or transmission ordering). As described above, each grant message may specify or otherwise indicate a single TXOP for the particular STA. If the AP does not detect a data transmission within a threshold duration (e.g., also referred to as a "transmit window") after broadcasting the grant message, then the AP may broadcast a subsequent grant message indicating the TXOP for the next STA in the sequence.

Figure 5:
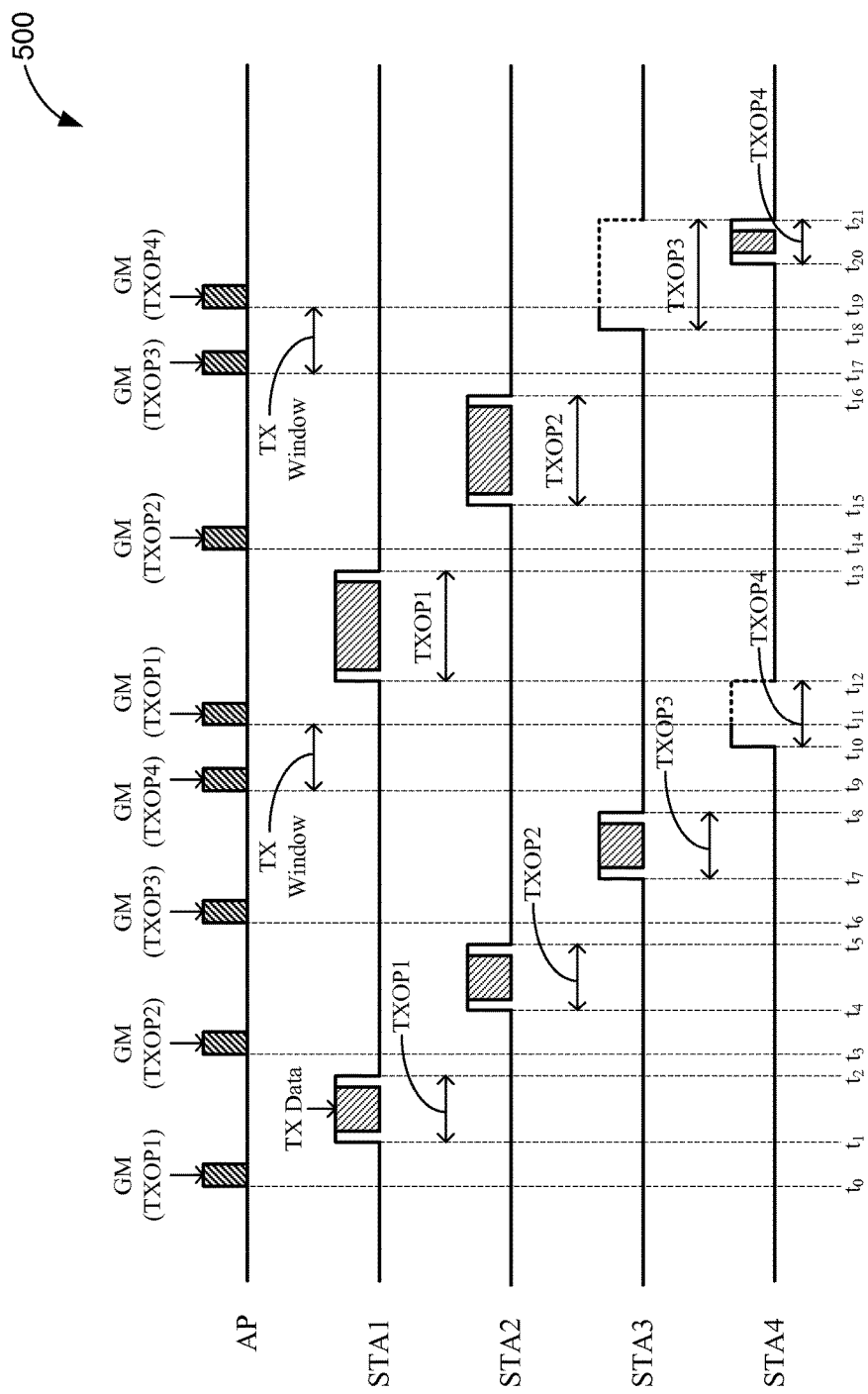
FIG. 5 shows an example timing diagram depicting a scheduling of uplink data transmissions by multiple STAs according to TXOPs granted by an AP based on a polling mechanism.

FIG. 5 shows an example timing diagram 500 depicting a scheduling of uplink data transmissions by multiple STAs according to TXOPs granted by an AP based on a polling mechanism. For purposes of discussion herein, the AP and stations STA1-STA4 may be AP 110 and stations STA1-STA4, respectively, of FIG. 1.

At time $t_0$, the AP 110 broadcasts a grant message indicating a transmit opportunity for STA1 (e.g., TXOP1). Since the AP 110 selectively grants access to the wireless medium by polling each of the stations STA1-STA4 in the WLAN 120, the individual STAs do not have to calculate respective start times to begin transmitting data. Thus, STA1 may begin transmitting UL data as soon as it receives the grant message from the AP 110, at time $t_1$, and may have continued access to the wireless medium for the duration of its transmit opportunity TXOP1, which lasts until time $t_2$. The other stations STA2-STA4 may also receive the grant message broadcast by the AP 110 (e.g., at time $t_0$), and in response thereto may refrain from attempting to access the wireless medium for the duration of the transmit opportunity TXOP1.

Upon completion of the transmit opportunity TXOP1, the AP 110 broadcasts a grant message indicating a transmit opportunity for STA2 (e.g., TXOP2), at time $t_3$. STA2 may begin transmitting UL data as soon as it receives the grant message from the AP 110, at time $t_4$, and may have continued access to the wireless medium for the duration of its transmit opportunity TXOP2, which lasts until time $t_5$. Upon completion of the transmit opportunity TXOP2, the AP 110 broadcasts a grant message indicating a transmit opportunity for STA3 (e.g., TXOP3), at time $t_6$. STA3 may begin transmitting UL data as soon as it receives the grant message from the AP 110, at time $t_7$, and may have continued access to the wireless medium for the duration of its transmit opportunity TXOP3, which lasts until time $t_8$.

At time $t_9$, the AP 110 broadcasts a grant message indicating a transmit opportunity for STA4 (e.g., TXOP4). However, STA4 may not have any UL data to transmit at this time, or STA4 may be idle or disconnected from the WLAN 120. In the example of FIG. 5, the AP 110 does not detect any UL data from STA4 within a threshold duration after broadcasting the grant message (e.g., a "TX window," from time $t_9$ to $t_{11}$). For example, the TX window may correspond with a SIFS duration (e.g., a minimum amount of time needed for a STA to process a received frame and send a response back to the AP 110). Accordingly, the AP 110 may revoke access to the wireless medium for STA4, before completion of the transmit opportunity TXOP4, and poll the next STA in the sequence (e.g., STA1). As described above, the AP 110 may increase the duration of the transmit opportunities TXOP1-TXOP3 for the other stations STA1-STA3, respectively (e.g., while reducing the duration of the transmit opportunity TXOP4 for STA4).

At time $t_{11}$, the AP 110 broadcasts a grant message indicating the adjusted TXOP1 (e.g., with the extended duration). STA1 may once again begin transmitting UL data as soon as it receives the grant message from the AP 110, at time $t_{12}$, and may have continued access to the wireless medium for the extended duration now associated with TXOP1, which lasts until time $t_{13}$. At time $t_{14}$, the AP 110 broadcasts a grant message indicating the adjusted TXOP2. STA2 may once again begin transmitting UL data as soon as it receives the grant message from the AP 110, at time $t_{15}$, and may have continued access to the wireless medium for the extended duration now associated with TXOP2, which lasts until time $t_{16}$.

At time $t_{17}$, the AP 110 broadcasts a grant message indicating the adjusted TXOP3. However, STA3 has no UL data to transmit at this time. Thus, upon expiration of the TX window (e.g., from time $t_{17}$ to $t_{19}$), and before completion of the transmit opportunity TXOP3, the AP 110 polls the next STA in the sequence (e.g., STA4). For example, at time $t_{19}$, the AP may broadcast a grant message indicating TXOP4. As described above, TXOP4 may be shorter in duration than the remaining transmit opportunities TXOP1-TXOP3 due to the required latency of STA4, the required latencies of the other stations STA1-STA3, and/or other properties of the WLAN 120. Thus, STA4 may begin transmitting UL data as soon as it receives the grant message from the AP 110, at time $t_{20}$, and may have continued access to the wireless medium for the shortened duration associated with TXOP4, which lasts until time $t_{21}$.

For some embodiments, the AP 110 may not follow CSMA/CA protocols when broadcasting grant messages to the stations STA1-STA4, thereby further reducing transmission latencies. In other embodiments, the AP 110 may follow CSMA/CA protocols when broadcasting grant messages, for example, to avoid collisions with data transmissions originating from nearby wireless networks sharing the same wireless medium (e.g., channel) as AP 110. Still further, the AP 110 may omit the back-off techniques associated with collision avoidance protocols, thereby reducing latencies as compared to the CSMA/CA techniques. Moreover, because the AP 110 has full control over the scheduling of TXOPs for each of the STAs, the AP 110 may implement any scheduling policy at any given time and/or assume control of the wireless.

In some instances, it may be desirable to switch between a polling-based medium access (e.g., as described above with respect to FIG. 5), and a TDMA-based medium access (e.g., as described above with respect to FIG. 2). For example, one medium access technique may be preferred over the other based on channel conditions and/or network requirements. Thus, in example embodiments, the AP 110 may selectively enable the stations STA1-STA4 to operate in either TDMA Mode (e.g., to implement TDMA-based medium access techniques) or Polling Mode (e.g., to implement polling-based medium access techniques). For example, the AP 110 may instruct the stations STA1-STA4 to operate in TDMA Mode or Polling Mode by modifying the RA field of a grant message. For example, the AP 110 may specify Polling Mode by inserting the MAC address of a particular station (e.g., STA1, STA2, STA3, or STA4) in the RA field of a grant message. The AP 110 may indicate TDMA Mode by inserting the BSSID of the AP 110 indicated in the RA field. Still further, the AP 110 may take control of the wireless medium (e.g., to transmit downlink data to the stations STA1-STA4) by inserting its own MAC address in the RA field of a grant message.

Figure 6:
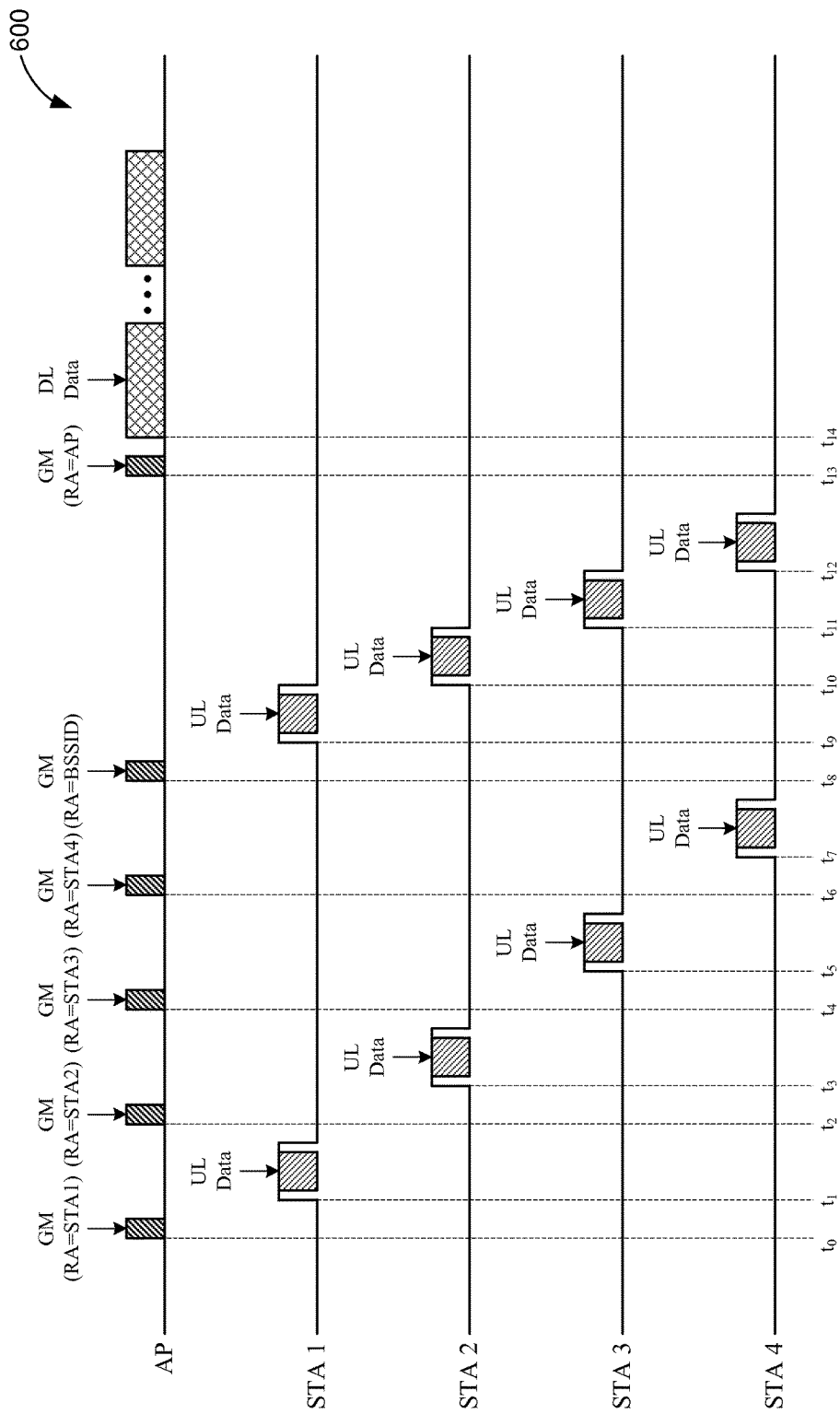
FIG. 6 shows an example timing diagram depicting a coordinated data exchange between STAs and an AP switching between multiple modes of medium access.

FIG. 6 shows an example timing diagram 600 depicting a coordinated data exchange between STAs and an AP switching between multiple modes of medium access. For purposes of discussion herein, the AP and stations STA1-STA4 may be AP 110 and stations STA1-STA4, respectively, of FIG. 1.

The AP 110 may initially grant access to the wireless medium based on a polling mechanism. For example, at time $t_0$, the AP 110 broadcasts a grant message with an RA field specifying the MAC address of STA1. The grant message may also include information pertaining to a TXOP for STA1. Upon detecting its own MAC address in the RA field of the received grant message, STA1 knows that it has been given exclusive access to the wireless medium. Thus, STA1 may transmit UL data, beginning at time $t_1$, for the duration of its TXOP. The remaining stations STA2-STA4 may also receive the grant message broadcast by the AP 110 (e.g., at time $t_0$), and in response thereto may refrain from attempting to access the wireless medium for the duration of the TXOP assigned to STA1.

At time $t_2$, the AP 110 broadcasts a grant message with an RA field specifying the MAC address of STA2 (e.g., and indicating a TXOP for STA2). STA2 may subsequently transmit UL data, beginning at time $t_3$, for the duration of its TXOP. At time $t_4$, the AP 110 broadcasts a grant message with an RA field specifying the MAC address of STA3 (e.g., and indicating a TXOP for STA3). STA3 may subsequently transmit UL data, beginning at time $t_5$, for the duration of its TXOP. At time $t_6$, the AP 110 broadcasts a grant message with an RA field specifying the MAC address of STA4 (e.g., and indicating a TXOP for STA4). STA4 may subsequently transmit UL data, beginning at time $t_7$, for the duration of its TXOP.

The AP 110 may then switch to a TDMA-based medium access technique, for example, based on changes in channel conditions and/or requirements of the stations STA1-STA4. For example, at time $t_8$, the AP 110 broadcasts a grant message with an RA field specifying the BSSID of the WLAN 120. The grant message may also include information pertaining to respective TXOPs for each of the stations STA1-STA4. Upon detecting the BSSID in the RA field of the received grant message, each of the stations STA1-STA4 may calculate their own start times relative to the grant message (e.g., as described above with respect to FIG. 2).

Once all of the stations STA1-STA4 have determined their respect start times, each STA may begin transmitting data at its corresponding start time, and may transmit for as long as its respective TXOP duration. When a particular TXOP duration ends, the next STA may begin transmitting data at its corresponding start time. For example, STA1 may transmit during its respective TXOP beginning at time $t_9$; STA2 may transmit during its respective TXOP beginning at time $t_{10}$; STA3 may transmit during its respective TXOP beginning at time $t_{11}$; and STA4 may transmit during its respective TXOP beginning at time $t_{12}$.

At time $t_{13}$, the AP 110 may assume control of the wireless medium, for example, by broadcasting a grant message specifying its own MAC address (e.g., the MAC address of the AP 110) in the associated RA field. Specifically, the AP 110 may take over the wireless medium so that it can transmit downlink (DL) data to one or more of the stations STA1-STA4. For example, upon detecting the BSSID in the RA field of a received grant message, each of the stations STA1-STA4 may be prepared to receive DL data (if available) from the AP 110. At time $t_{14}$, the AP 110 may proceed to transmit buffered DL data to the stations STA1-STA4 (e.g., until the start of the next service period). For some embodiments, the AP 110 may continuously transmit DL data to the stations STA1-STA4 without waiting for acknowledgement (ACK) frames from the STAs.

In some instances, the AP 110 may fail to receive UL data from one or more of the stations STA1-STA4 during their respective TXOPs. In example embodiments, while the AP 110 has exclusive access to the wireless medium (e.g., from time $t_{13}$ to the start of the next service period), the AP 110 may request retransmission of UL data from any STAs that did not transmit any UL data during its respective TXOP. For example, the AP 110 may request retransmission from a particular STA by broadcasting another grant message specifying the MAC address of the STA in the corresponding RA field (e.g., and by setting the "Retry" field of the control frame to "1").

Figure 7:
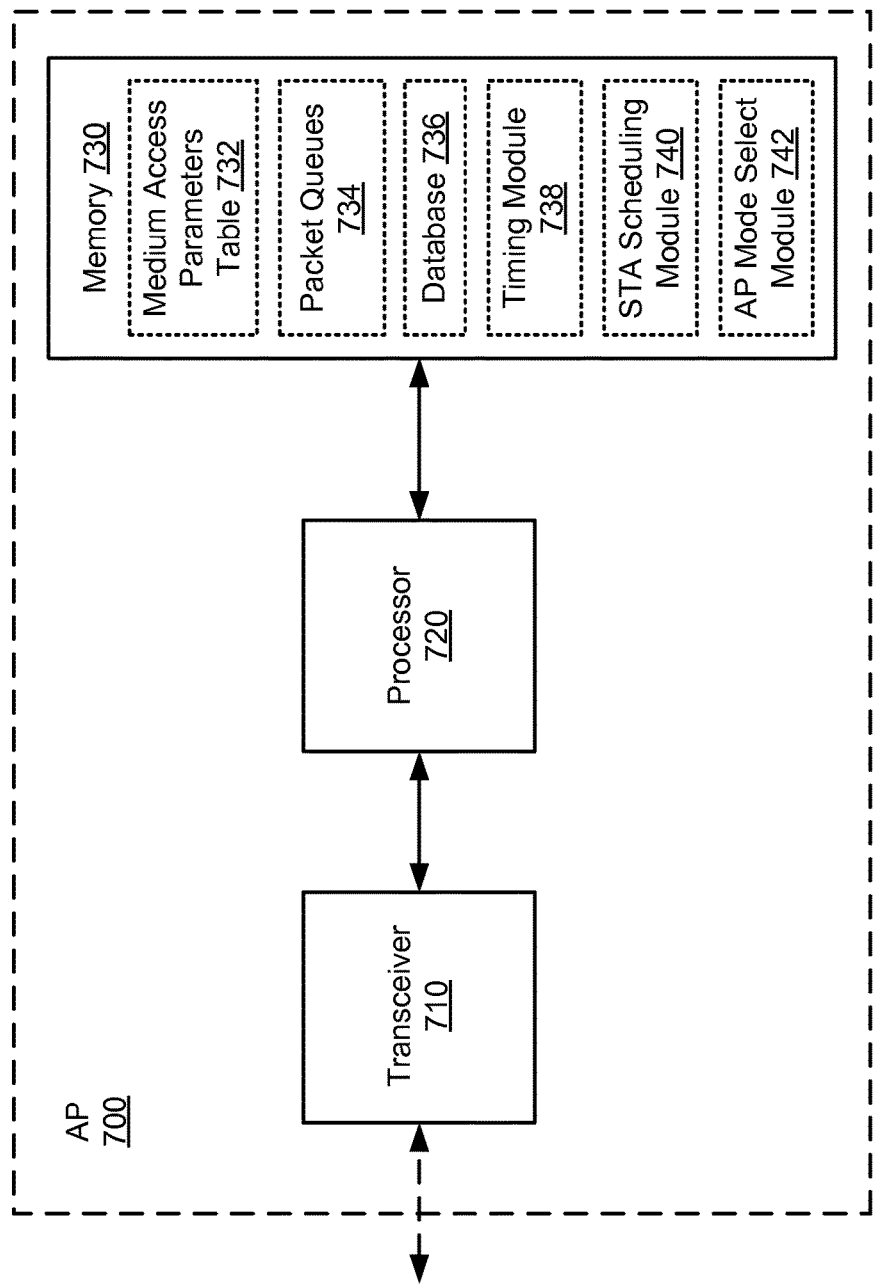
FIG. 7 shows an AP in accordance with example embodiments.

FIG. 7 shows an AP 700 in accordance with example embodiments. AP 700 may be one embodiment of the AP 110 of FIG. 1. AP 700 includes at least a transceiver 710, a processor 720, and a memory 730. The transceiver 710 may be used to communicate wirelessly with other suitable wireless devices (e.g., including wireless access points and/or wireless stations). Processor 720, which is coupled to transceiver 710 and memory 730, may be any suitable one or more processors capable of executing scripts or instructions of one or more software programs stored in the AP 700 (e.g., within memory 730). For purposes of discussion herein, processor 720 is shown in FIG. 7 as being coupled between transceiver 710 and memory 730. For actual embodiments, transceiver 710, processor 720, and/or memory 730 may be connected together using one or more buses (not shown for simplicity).

Memory 730 may include a medium access parameters table 732 that may store a number of medium access parameters including, for example, transmission schedules, TXOP durations, and/or other information associated with controlling access to the wireless medium of the WLAN 120 of FIG. 1. Memory 730 may also include a number of packet queues 734. The packet queues 734 may store packets to be transmitted from AP 700 to one or more STAs (e.g., as DL data packets). Memory 730 may also include a database 736 that may be used (e.g., as a local cache) to store the scheduled target beacon transmission times (TBTTs), media access control (MAC) addresses or other identifying information of a plurality of STAs (or APs), AID values, supported data rates, latency information, and/or other suitable location or configuration information pertaining to the STAs (or APs) in the WLAN 120.

Memory 730 may also include a non-transitory computer-readable medium (e.g., one or more nonvolatile memory elements, such as EPROM, EEPROM, Flash memory, a hard drive, etc.) that may store the following software modules:
- a timing module 738 to derive, schedule, and/or modify transmit opportunities (TXOPs) for each of the STAs in the WLAN 120;
- a STA scheduling module 740 to grant medium access to one or more of the STAs based on their respective TXOPs using one or more medium access techniques (e.g., such as TDMA-based medium access, on-demand medium access, and/or polling-based medium access); and
- an AP mode select module 742 to select one of the medium access techniques to be implemented by the AP 700 based at least in part on channel conditions and/or network requirements of the WLAN 120.

Each software module includes instructions that, when executed by processor 720, cause AP 700 to perform the corresponding functions. The non-transitory computer-readable medium of memory 730 thus includes instructions for performing all or a portion of the AP-side operations described below with respect to FIGS. 9 and 10.

For example, processor 720 may execute the timing module 738 to derive, schedule, and/or modify TXOPs for each of the STAs in the WLAN 120. Processor 720 may also execute the STA scheduling module 740 to grant medium access to one or more of the STAs based on their respective TXOPs using one or more medium access techniques (e.g., such as TDMA-based medium access, on-demand medium access, or polling-based medium access). Further, processor 720 may execute the AP mode select module 742 to select one of the medium access techniques to be implemented by the AP 700 based at least in part on channel conditions and/or network requirements of the WLAN 120.

Figure 8:
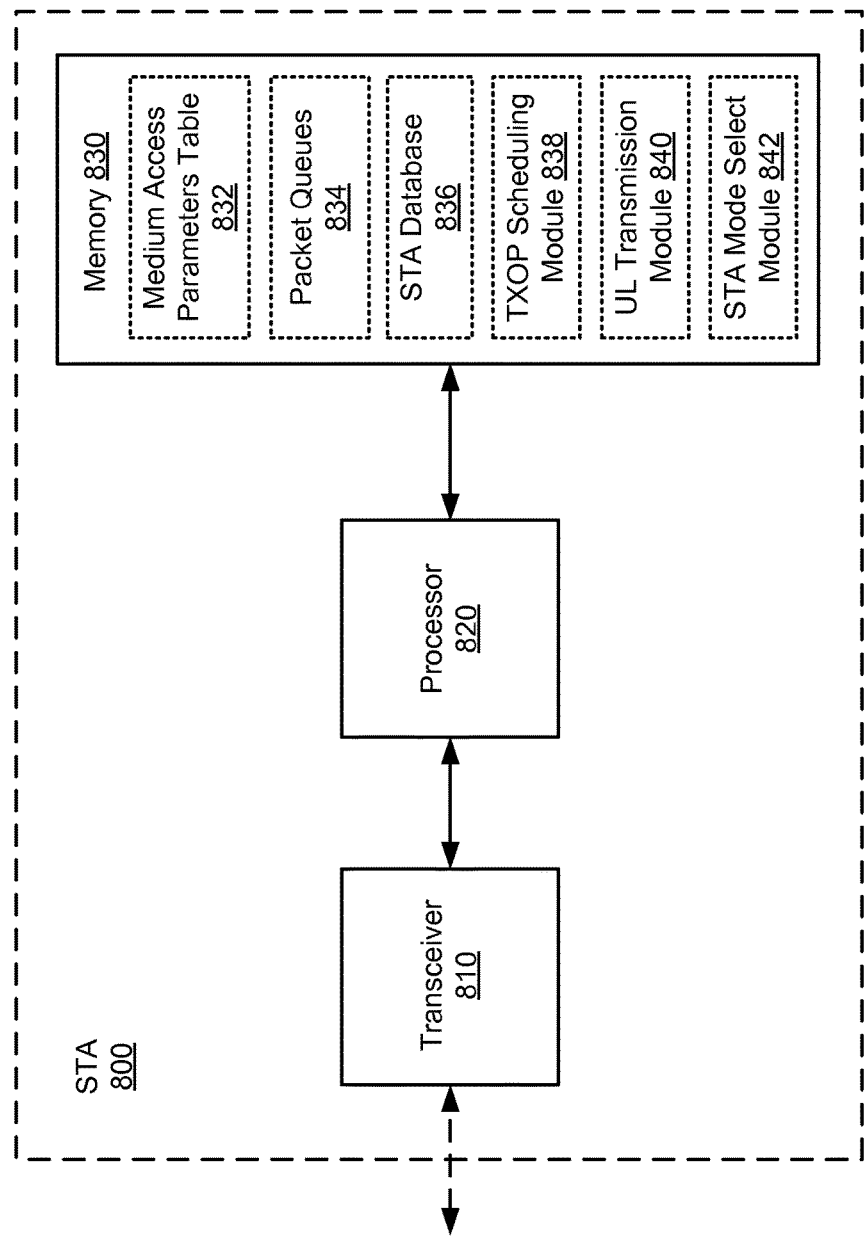
FIG. 8 shows a STA in accordance with example embodiments.

FIG. 8 shows a STA 800 in accordance with example embodiments. STA 800 may be one embodiment of at least one of the stations STA1-STA4 of FIG. 1. STA 800 includes a transceiver 810, a processor 820, and a memory 830. The transceiver 810 may be used to communicate wirelessly with other suitable wireless devices (e.g., including wireless access points and/or wireless stations). Processor 820, which is coupled to transceiver 810 and memory 830, may be any suitable one or more processors capable of executing scripts or instructions of one or more software program stored in the STA 800 (e.g., within memory 830). For purposes of discussion herein, processor 820 is shown in FIG. 8 as being coupled between transceiver 810, processor 820, and memory 830. For actual embodiments, transceiver 810, processor 820, and/or memory 830 may be connected together using one or more buses (not shown for simplicity).

Memory 830 may include a medium access parameters table 832 that may store a number of medium access parameters including, for example, transmission schedules, TXOP durations, and/or other information associated with accessing the wireless medium of the WLAN 120 of FIG. 1. Memory 830 may include a number of packet queues 834. The packet queues 834 may store packets to be transmitted from STA 800 to an associated AP and/or other STAs (e.g., as UL data packets). Memory 830 may include a STA database 836 that may be used (e.g., as a local cache) to store the media access control (MAC) addresses or other identifying information of a plurality of STAs (or APs), scheduled target beacon transmission times (TBTTs), AID values, supported data rates, latency requirements, and/or other suitable location or configuration information pertaining to the STAs (or APs) in the WLAN 120.

Further, memory 830 may also include a non-transitory computer-readable storage medium (e.g., one or more non-volatile memory elements, such as EPROM, EEPROM, Flash memory, a hard drive, etc.) that may store the following software modules:
- a transmit opportunity (TXOP) scheduling module 838 to determine one or more time slots during which the STA 800 may access the wireless medium;
- an uplink (UL) transmission module 840 to schedule UL data transmissions to an associated AP during the one or more time slots allocated for the STA 800; and
- a STA mode select module 842 to select a medium access technique (e.g., such as TDMA-based medium access, on-demand medium access, or polling-based medium access) to be implemented by the STA 800 for determining the one or more time slots.

Each software module includes instructions that, when executed by processor 820, cause the STA 800 to perform the corresponding functions. The non-transitory computer-readable medium of memory 830 thus includes instructions for performing all or a portion of the operations of FIG. 11.

For example, processor 820 may execute the TXOP scheduling module 838 to determine one or more time slots during which the STA 800 may access the wireless medium. Processor 820 may also execute the UL transmission module 840 to schedule UL data transmission to an associated AP during the one or more time slots allocated for the STA 800. Further, processor 820 may also execute the STA mode select module 842 to select a medium access technique (e.g., such as TDMA-based medium access, on-demand medium access, or polling-based medium access) to be implemented by the STA 800 for determining the one or more time slots.

Figure 9:
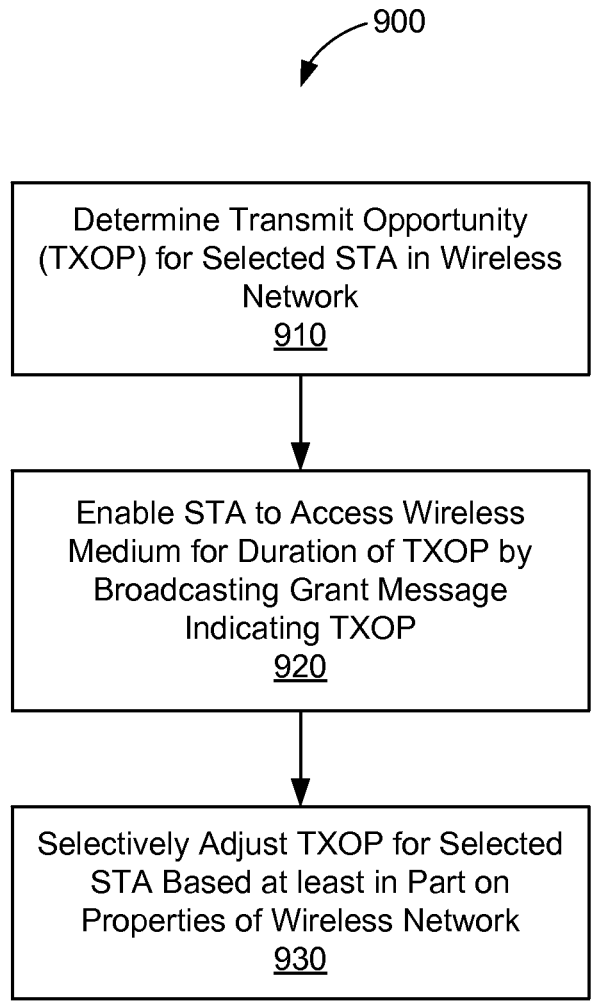
FIG. 9 shows a flowchart depicting an example operation for managing access to a wireless medium.

FIG. 9 shows a flowchart depicting an example operation 900 for managing access to a wireless medium. With reference, for example, to FIG. 1, the example operation 900 may be performed by the AP 110 to selectively grant medium access to each of the stations STA1-STA4 in the WLAN 120. The AP 110 first determines a transmit opportunity (TXOP) for a selected STA in the WLAN 120 (910). For example, the TXOP may be associated with a start time and a duration within which the STA is permitted to transmit UL data via the wireless medium. In example embodiments, the AP 110 may determine the TXOP based at least in part on a latency requirement of the STA, latency requirements of other STAs in the WLAN 120, the number of STAs in the WLAN 120, and/or other parameters of the WLAN 120.

The AP 110 may enable the selected STA to access the wireless medium for the duration of the TXOP by broadcasting a grant message indicating the TXOP to the stations STA1-STA4 (920). For some embodiments, the AP 110 may enable each of the stations STA1-STA4 in the WLAN 120 to access the wireless medium using TDMA-based medium access techniques (e.g., as described above with respect to FIG. 2). For example, the AP 110 may broadcast a single grant message containing TXOPs for all of the stations STA1-STA4, and subsequently allow the STAs to calculate their own start times and end times (e.g., TXOP durations). For other embodiments, the AP 110 may provide access to the wireless medium in an on-demand fashion (e.g., as described above with respect to FIG. 4). For example, the AP 110 may selectively a broadcast grant message containing a single TXOP (e.g., for the selected STA) in response to receiving a request to access the wireless medium (e.g., in the form of an RTS frame) from the selected STA. Still further, for some embodiments, the AP 110 may poll each of the stations STA1-STA4 to determine whether the STAs have UL data to send (e.g., as described above with respect to FIG. 5). For example, the AP 110 may broadcast individualized grant messages, each containing a TXOP for a different STA, in a round-robin fashion to ensure that each of the stations STA1-STA4 is given an opportunity to transmit UL data via the wireless medium during a given service interval.

The AP 110 may adjust the TXOP for the selected STA based at least in part on one or more properties of the WLAN 120 (930). For example, the AP 110 may increase or decrease the TXOP duration and/or frequency for the selected STA based on changes in latency requirements of the selected STA and/or of other STAs in the WLAN 120. The AP 110 may also adjust the TXOP duration and/or frequency for the selected STA to account for changes in the number of STAs in the WLAN 120. Still further, the AP 110 may adjust the TXOP duration and/or frequency for the selected STA based on changes in channel conditions and/or other properties of the WLAN 120.

Figure 10:
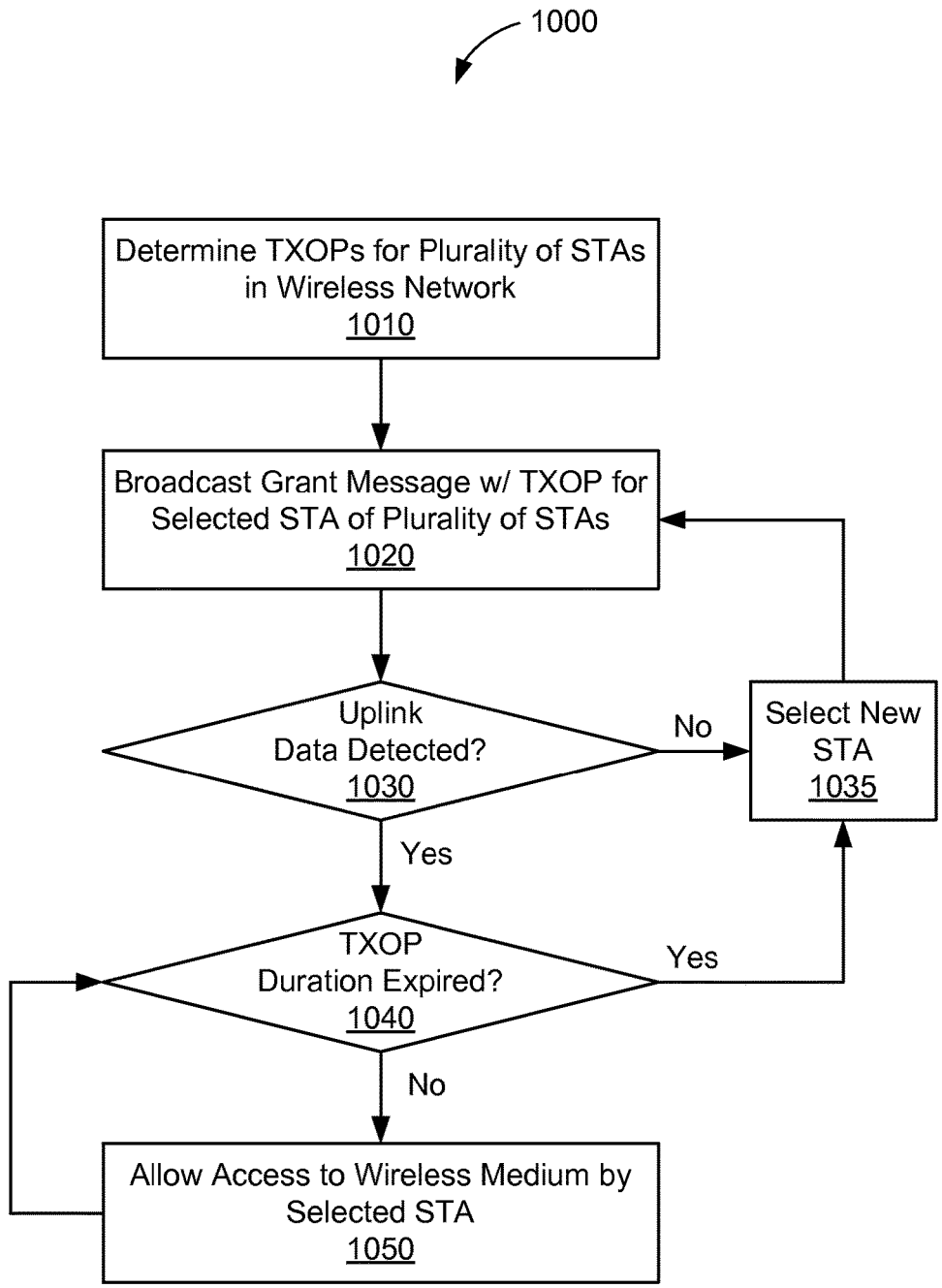
FIG. 10 shows a flowchart depicting an example polling operation for granting access to a wireless medium.

FIG. 10 shows a flowchart depicting an example polling operation 1000 for granting access to a wireless medium. With reference, for example, to FIG. 7, the operation 1000 may be performed by the AP 700 to control or manage access to a wireless medium by a plurality of STAs in a corresponding wireless network.

The AP 700 first determines respective TXOPs for each of the plurality of STAs in the wireless network (1010). For example, the processor 720 may execute the timing module 738 to determine TXOP durations for which each of the STAs may be granted exclusive access to the wireless medium. The processor 720, in executing the timing module 738, may determine the TXOP durations based at least in part on a latency requirement of each STA, latency requirements of other STAs in the network, the number of STAs in the network, and/or based on other parameters of the wireless network.

The AP 700 may then broadcast a grant message containing a TXOP for a selected STA of the plurality of STAs (1020). For example, the processor 720 may execute the STA scheduling module 740 to determine a schedule and/or order in which each of the plurality of STAs is to be granted access to the wireless medium. The processor 720, in executing the STA scheduling module 740, may then proceed by broadcasting a grant message to the first STA in the scheduled order of STAs. In example embodiments, the grant message may contain an RA field specifying the MAC address of the selected STA (e.g., to indicate that the STAs are to use polling-based medium access techniques). The grant message may further specify or otherwise indicate the TXOP duration allocated for the selected STA.

After broadcasting the grant message, the AP 700 may determine whether uplink data (UL) is received from the selected STA within a threshold duration (1030). For example, the threshold duration may correspond with a SIFS duration. If no uplink data is detected within the threshold duration after broadcasting the grant message, as tested at 1030, the AP 700 may proceed by selecting a new STA to be granted medium access (1035). For example, the processor 720, in executing the STA scheduling module 740, may select the next STA in the scheduled order of STAs. The AP 700 may then broadcast a subsequent grant message with an RA field specifying the MAC address of the new STA (1020). As described above, the grant message may also indicate the TXOP for the new STA.

Conversely, if the selected STA begins transmitting UL data before the threshold duration expires, as tested at 1030, the AP 700 may the selected STA continued access to the wireless medium for the remainder of the TXOP (e.g., until the TXOP expires) (1040). Thus, as long as the current TXOP duration has not expired, as tested at 1040, the AP 700 may allow the selected STA to have exclusive access to the wireless medium (1050). For example, the processor 720, in executing the STA scheduling module 740, may refrain from broadcasting a subsequent grant message until the current TXOP is completed. Once the TXOP duration expires, the AP 700 may select a new STA to be granted medium access (1035), and may subsequently broadcast a grant message with an RA field specifying the MAC address of the new STA (1020).

Figure 11:
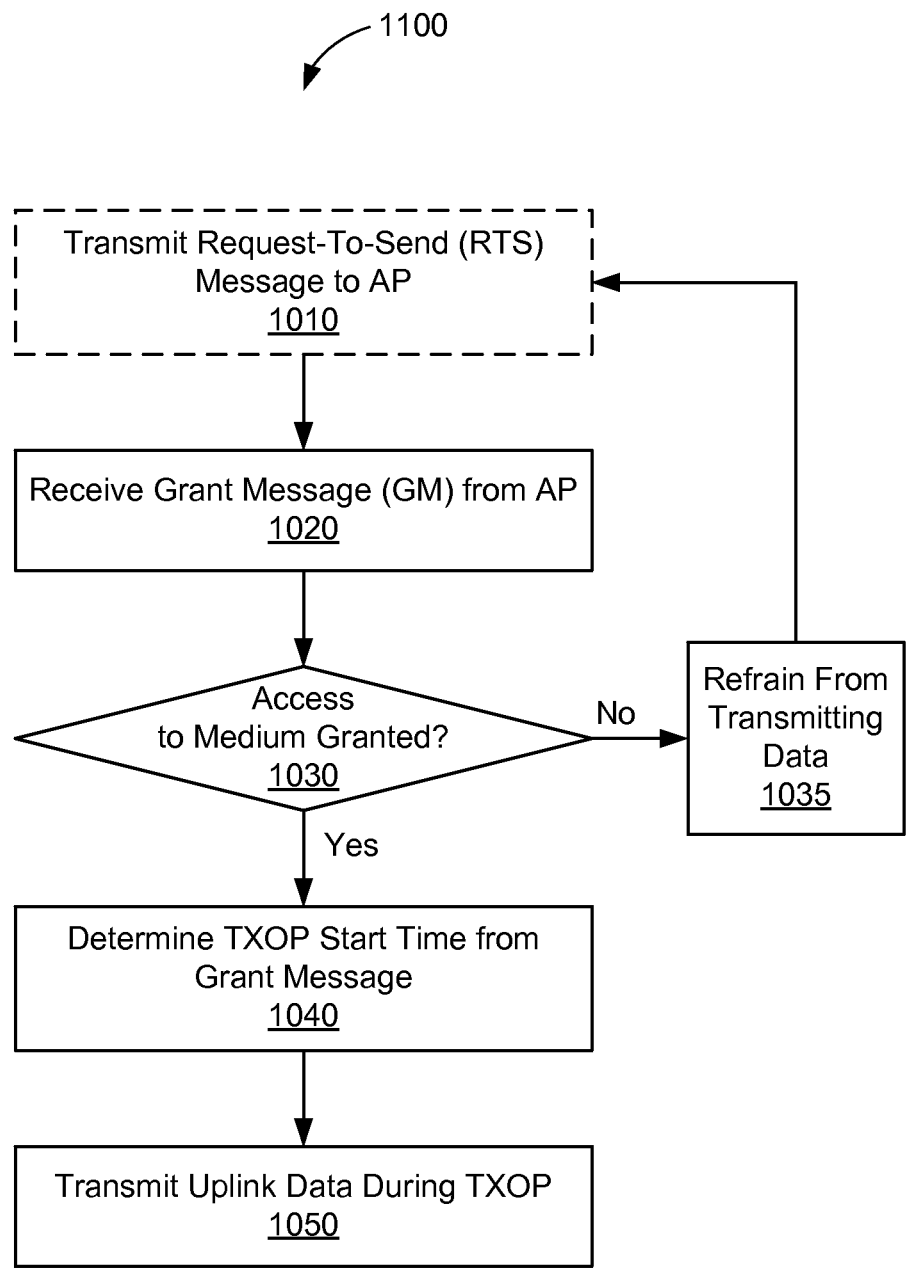
FIG. 11 shows a flowchart depicting an example operation for access a wireless medium to transmit uplink data.

FIG. 11 shows a flowchart depicting an example operation 1100 for accessing a wireless medium to transmit uplink data. With reference, for example, to FIG. 8, the operation 1100 may be performed by the STA 800 to access a wireless medium controlled by an AP.

In example embodiments, the processor 820 may first execute the STA mode select module 842 to determine whether access to the wireless medium is to be granted using a TDMA-based access technique, an on-demand access technique, or a polling-based access technique. For some embodiments, if the AP grants medium access in an on-demand manner, the STA 800 may first transmit a request-to-send (RTS) message to the AP (1010). For example, when buffered DL data is stored in the packet queues 834, the processor 820 may execute the TXOP scheduling module 838 to generate an RTS message to be sent to the AP.

The STA 800 receives a grant message broadcast by the AP (1020), and analyzes the grant message to determine whether the STA 800 has been granted access to the wireless medium (1030). For example, the processor 820, in executing the TXOP scheduling module 838, may determine whether the grant message specifies or otherwise indicates a TXOP duration for the STA 800. If the grant message indicates a TXOP duration for another STA (e.g., does not include any TXOP information for STA 800), the STA 800 may refrain from transmitting data on the wireless medium for at least the specified TXOP duration (1035).

If the grant message specifies a TXOP duration for STA 800, as tested at 1030, the STA 800 may determine a start time for its TXOP based at least in part on the information provided in the grant message (1040), and may subsequently transmit UL data during its scheduled TXOP (1050). For example, the processor 820 may execute the UL transmission module 840 to determine, based on the selected mode of medium access, when to begin transmitting UL data on the wireless medium. If medium access is granted in an on-demand manner or through polling, the processor 820, in executing the UL transmission module 840, may begin transmitting UL data as soon as it receives the associated grant message from the AP 110 (e.g., and may continue transmitting UL data for the duration of its TXOP). If medium access is granted in a TDMA manner, the processor 820, in executing the UL transmission module 840, may calculate a start time for its TXOP (e.g., relative to the reception of the grant message) and begin transmitting UL data only after its particular start time has commenced (e.g., and may continue transmitting UL data for the duration of its TXOP).

In the foregoing specification, example embodiments have been described with reference to specific examples. It will, however, be evident that various modifications and changes may be made thereto without departing form the broader scope of the disclosure as set forth in the appended claims. For example, the method steps depicted in the flow charts of FIGS. 9-11 may be performed in other suitable orders, multiple steps may be combined into a single step, and/or some steps may be omitted (or further steps included). The specification and drawings are, accordingly, to be regarded in an illustrative sense rather than a restrictive sense.

What is claimed is:

1. A method of managing access to a wireless medium by a plurality of stations (STAs) in a wireless network, the method comprising:
   determining a first transmit opportunity within a first beacon interval for a first STA of the plurality of STAs;
   determining a second transmit opportunity within the first beacon interval for a second STA of the plurality of STAs;
   enabling the first STA to access the wireless medium for a duration of the first transmit opportunity and the second STA to access the wireless medium for a duration of the second transmit opportunity by broadcasting a first grant message to the plurality of STAs in the wireless network, wherein the first grant message indicates allocation of the first transmit opportunity to the first STA and allocation of the second transmit opportunity to the second STA;
   determining a latency requirement of the first STA based at least in part on a frequency of transmissions by the first STA; and
   selectively adjusting a duration of a subsequent first transmit opportunity and a duration of a subsequent second transmit opportunity based at least in part on the latency requirement of the first STA, wherein the subsequent first transmit opportunity and the subsequent second transmit opportunity are within a second beacon interval.

2. The method of claim 1,
   wherein the second transmit opportunity is subsequent to the first transmit opportunity.

3. The method of claim 2, further comprising:
   enabling the second STA to access the wireless medium for the duration of the subsequent second transmit opportunity by broadcasting a second grant message to the plurality of STAs in the wireless network.

4. The method of claim 3, wherein enabling the second STA to access the wireless medium comprises:
   enabling the second STA to access the wireless medium upon completion of the subsequent first transmit opportunity.

5. The method of claim 3, wherein enabling the second STA to access the wireless medium comprises:
   granting access to the wireless medium by the second STA after a threshold duration if no data is received from the first STA within the threshold duration.

6. The method of claim 5, wherein the threshold duration is a short interframe space (SIFS) duration.

7. The method of claim 1, wherein the first transmit opportunity is selectively adjusted based at least in part on a number of STAs in the wireless network.

8. The method of claim 1, wherein the wireless network is an IEEE 802.11 wireless network, and wherein the first transmit opportunity is repeated one or more times within the first beacon interval.

9. A device for managing access to a wireless medium by a plurality of stations (STAs) in a wireless network, the device comprising:
   a transceiver to exchange wireless signals with the plurality of STAs in the wireless network;
   one or more processors; and
   a memory storing instructions that, when executed by the one or more processors, cause the device to:
      determine a first transmit opportunity within a first beacon interval for a first STA of the plurality of STAs;
      determine a second transmit opportunity within the first beacon interval for a second STA of the plurality of STAs;
      enable the first STA to access the wireless medium for a duration of the first transmit opportunity and the second STA to access the wireless medium for a duration of the second transmit opportunity by broadcasting a first grant message to the plurality of STAs in the wireless network, wherein the first grant message indicates allocation of the first transmit opportunity to the first STA and allocation of the second transmit opportunity to the second STA;
      determine a latency requirement of the first STA based at least in part on a frequency of transmissions by the first STA; and selectively adjust a duration of a subsequent first transmit opportunity and a duration of a subsequent second transmit opportunity based at least in part on the latency requirement of the first STA, wherein the subsequent first transmit opportunity and the subsequent second transmit opportunity are within a second beacon interval.

10. The device of claim 9, wherein the second transmit opportunity is subsequent to the first transmit opportunity.

11. The device of claim 10, wherein execution of the instructions further causes the device to:
enable the second STA to access the wireless medium for the duration of the subsequent second transmit opportunity by broadcasting a second grant message to the plurality of STAs in the wireless network.

12. The device of claim 11, where execution of the instructions to enable the second STA to access the wireless medium causes the device to:
enable the second STA to access the wireless medium upon completion of the subsequent first transmit opportunity.

13. The device of claim 11, wherein execution of the instructions to enable the second STA to access the wireless medium causes the device to:
grant access to the wireless medium by the second STA after a threshold duration if no data is received from the first STA within the threshold duration.

14. The device of claim 13, wherein the threshold duration is a short interframe space (SIFS) duration.

15. The device of claim 9, wherein the wireless network is an IEEE 802.11 wireless network, and wherein the first transmit opportunity is repeated one or more times within a beacon interval.

16. A non-transitory computer-readable medium storing instructions that, when executed by one or more processors of a device to manage access to a wireless medium by a plurality of stations (STAs) in a wireless network, causes the device to perform operations comprising:

determining a first transmit opportunity within a first beacon interval for a first STA of the plurality of STAs;

determining a second transmit opportunity within the first beacon interval for a second STA of the plurality of STAs;

enabling the first STA to access the wireless medium for a duration of the first transmit opportunity and the second STA to access the wireless medium for a duration of the second transmit opportunity by broadcasting a first grant message to the plurality of STAs in the wireless network, wherein the first grant message indicates allocation of the first transmit opportunity to the first STA and allocation of the second transmit opportunity to the second STA;

determining a latency requirement of the first STA based at least in part on a frequency of transmissions by the first STA; and selectively adjusting a duration of a subsequent first transmit opportunity and a duration of a subsequent second transmit opportunity based at least in part on the latency requirement of the first STA, wherein the subsequent first transmit opportunity and the subsequent second transmit opportunity are within a second beacon interval.

* * * * *